United States Patent
Li

(10) Patent No.: US 6,272,765 B1
(45) Date of Patent: *Aug. 14, 2001

(54) TAPE MEASURE HOUSING WITH SLIP RESISTANT PAD STRUCTURE

(76) Inventor: Shinh Lin Li, 1F, No. 22, Lane 81, Sec. 2, Tunha S. Rd., Taipei (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,150

(22) Filed: Oct. 13, 1998

(51) Int. Cl.[7] ........................................ G01B 3/10
(52) U.S. Cl. ................................. 33/769; 33/768
(58) Field of Search .......................... 33/760, 761, 768, 33/769, 347

(56) References Cited

U.S. PATENT DOCUMENTS

| 2,133,605 | * | 10/1938 | Wikstrom | 33/347 |
| 4,908,954 | * | 3/1990 | Johnson | 33/768 |
| 5,134,784 | * | 8/1992 | Atienza | 33/769 |
| 5,379,524 | * | 1/1995 | Dawson | 33/768 |
| 5,440,820 | * | 8/1995 | Hwang | 33/769 |
| 5,746,004 | * | 5/1998 | Wertheim | 33/769 |

* cited by examiner

Primary Examiner—G. Bradley Bennett
(74) Attorney, Agent, or Firm—Raymond Y. Chan; David and Raymond Patent Group

(57) ABSTRACT

Disclosed is a tape measure housing with slip resistant pad structure characterized in that it is comprising a tape measure housing and a slip resistant pad. A recesses portion is formed on the housing and both sides of the recessed portion are formed of engaging grooves for fastening the slip resistant pad thereto. A decorative pattern is formed on the surface of the slip resistant pad, while at the both sides of the pad being provided press fit stripes as auxiliary components for assembly. The lower side of the press fit stripe is formed into an inversely stretched claw so as to deeply stretch into the engaging groove and firmly hook on the inner wall of the groove. To secure closely matching the appearance of the housing, the slip resistant pad is made into an arc or other desirable shapes.

4 Claims, 3 Drawing Sheets

TAPE MEASURE HOUSING WITH SLIP RESISTANT PAD STRUCTURE

BACKGROUND OF THE INVENTION

1. Field of Invention

The present invention relates to a tape measure housing, and more particularly to a slip resistant pad structure provided for a tape measure housing.

2. Description of Related Arts

At present, most of the conventional tape measure housings are equipped with slip resistant stripes which are provided on the proper portions on the housings by electric spark machining or carving during die molding process and formed in the shape of protruded stripes or recessed grooves. The slip resistant stripes contribute to facilitate a user to grip the housing with his (her) hand and prevent the tape measure from slipping down to ground when he (her) palm is sweating. Owing to the fact that the plastic housing is usually manufactured by ejection process. Hard plastic is preferable to be employed as housing material for maintaining neat appearance and required strength so that the slip resistant effect for the tape measure can be lowered.

Accordingly, in order to rectify the above mentioned problem, manufacturers cover outer periphery of the housing with soft plastic to form a slip resistant surface to improve the grip comfortability of an user's palm and enhance its gripping strength. G. D. Wertheim discloses "Tape Rule Housing" in U.S. Pat. No. 5,746,004, in which a recessed portion is provided on the housing for installing thereon an elastomeric grip element, which provides a slip resistant and comfortable gripping surface for the user's palm and thumb. Obviously, the elastomeric grip can serve equivalently as slip resistant means as mentioned above. Referring to claim 4 of the above cited patent, said grip element is adhesively bonded to said peripheral wall. And further referring to claim 9, said grip element is comprised of a pair of cooperatively configurated and dimensioned sectors seated in said recessed portions and bonded thereto. However, this is an embodiment based on not well matured conception. In ordered to bond the elastomeric grip on the housing, time for awaiting the adhesive to harden must be reserved after bonding the elastomeric grip element in the housing during fabrication of the housing. This causes inconveniency and inefficiency of fabrication process. Moreover, the bonded grip element may possibly peel off the housing after frequent use of the tape measure and it is troublesome to repair.

Accordingly, there is an urgent need for developing a new slip resistant pad structure for a tape measure, and fortunately the inventor of the present invention has recently succeeded in developing such as structure for tape measure, thereby the above mentioned problems can be solved in all.

SUMMARY OF THE PRESENT INVENTION

It is an object of the present invention to provide a slip resistant pad structure for a tape measure, which has a simple construction that can be easily and promptly assembled and detached.

It is another object of the present invention to provide a slip resistant pad structure which does not require any adhesive to bond the slip resistant pad on the housing.

It is one more object of the present invention to provide a slip resistant pad structure for a tape measure, which can be comfortably gripped in an user's palm and never slip off the user's control.

It is still one more object of the present invention to provide a slip resistant pad structure for a tape measure which can minimize the production cost of a tape measure due to effectively shortened fabrication and assembly work time.

To achieve these and other objects, the slip resistant pad structure for a tape measure of the present invention comprises a housing and a slip resistant pad characterized in that there is a recessed portion provided on the housing, above each of both sides if the recessed portion they are elongated engaging slots provided for fastening the slip resistant pad thereto. A decorative pattern is formed on the surface of the slip resistant pad, while at its both sides a pair of press fit stripes are provided components for assembly. The lower inner side of each of the press fit stripe forms an inversely stretched claw so as to deeply stretch into the donated engaging slots and firmly hook on an inner wall of the engaging slots in order to complete the assembly of the slip resistant pad. To secure closely matching the appearance of the housing, the slip resistant pad is made into an arc or other desirable shapes.

BRIEF DESCRIPTION OF THE DRAWINGS

The following drawings disclose an illustrative embodiment of the present invention which serves to exemplify the various advantages and objects hereof.

DETAILED DESCRIPTION OF THE PREFERRED EMBODIMENT

Figure 1:
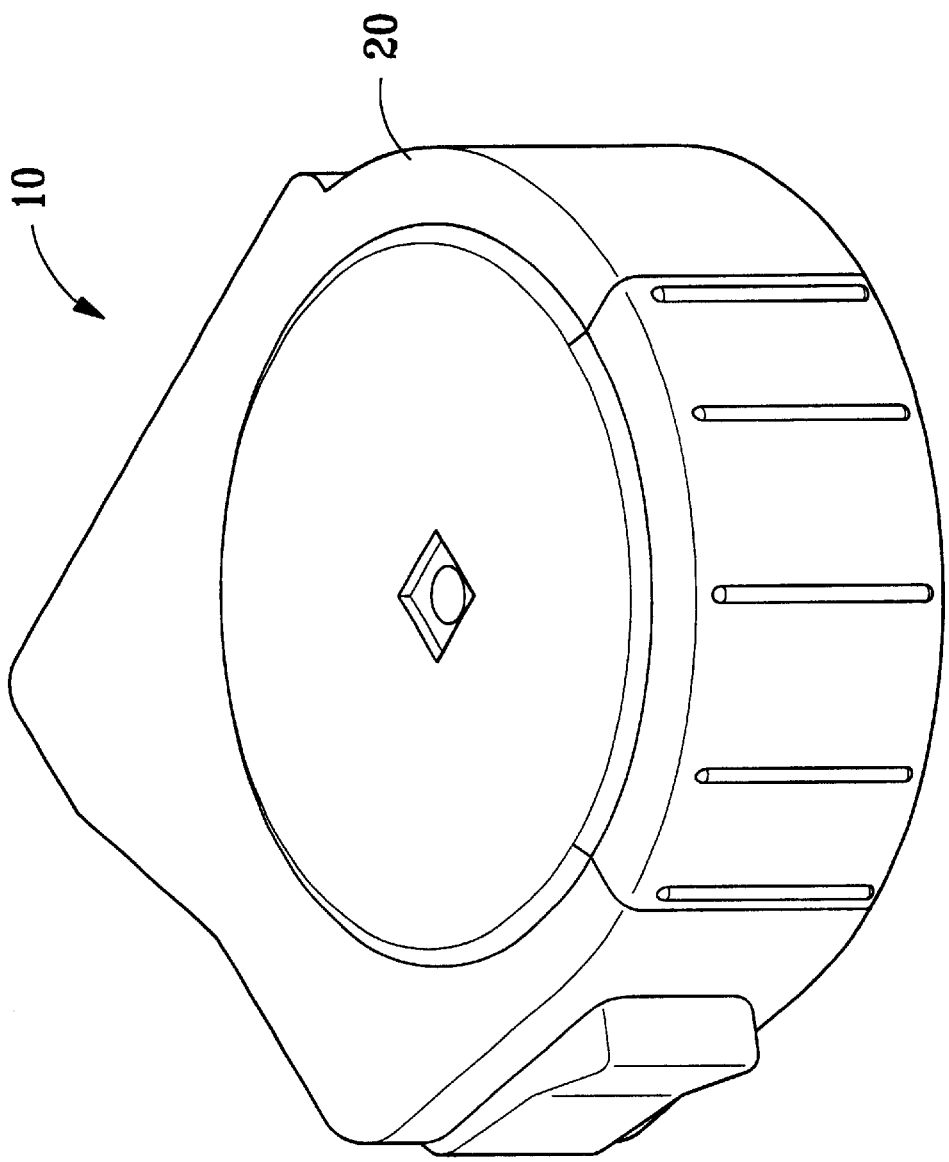
FIG. 1 is a perspective view of the tape measure housing with slip resistant pad structure of the present invention.
Figure 2:
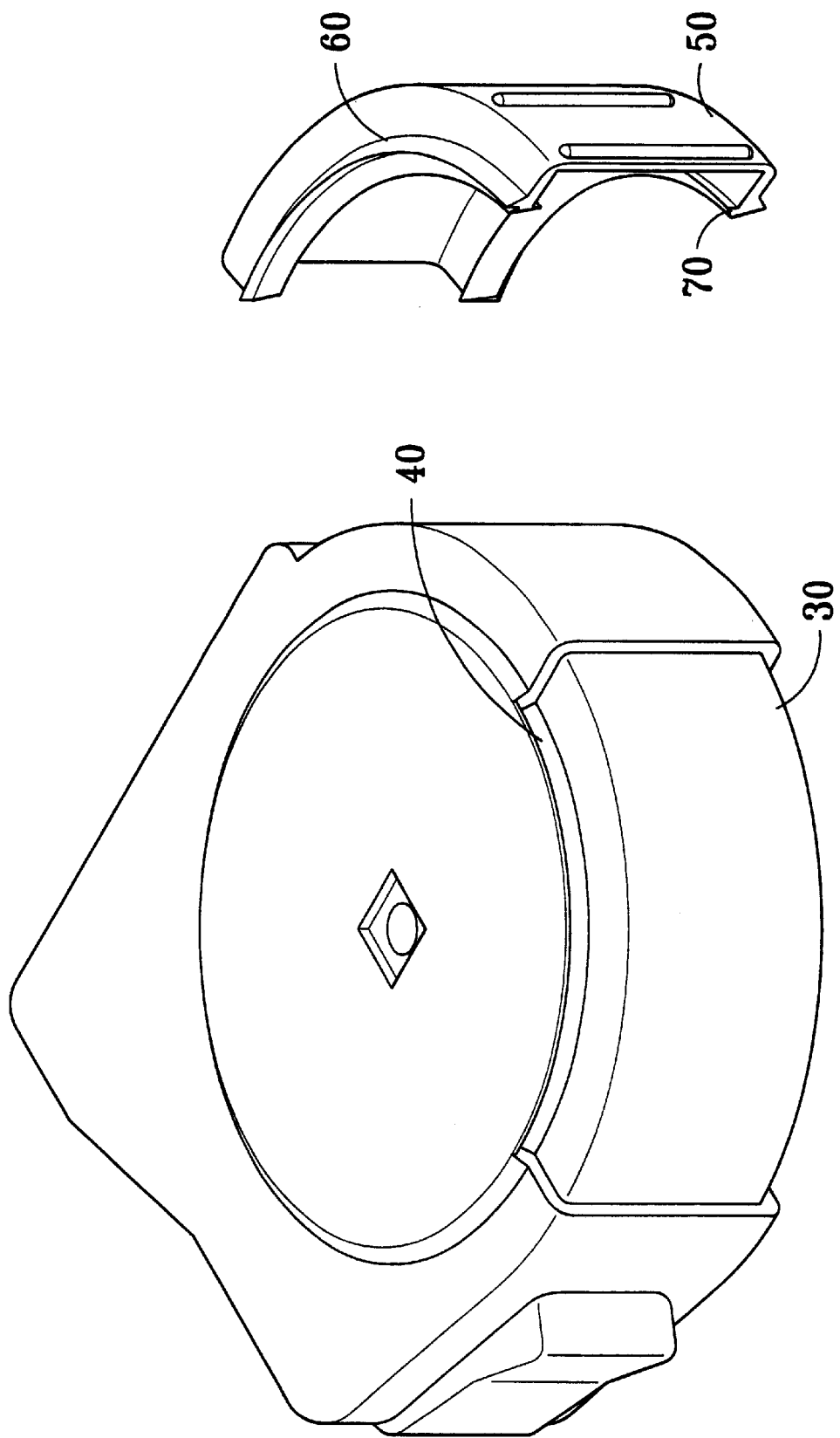
FIG. 2 is an exploded perspective view sowing the components of the tape measure housing with slip resistant pad structure of the present invention.
Figure 3:
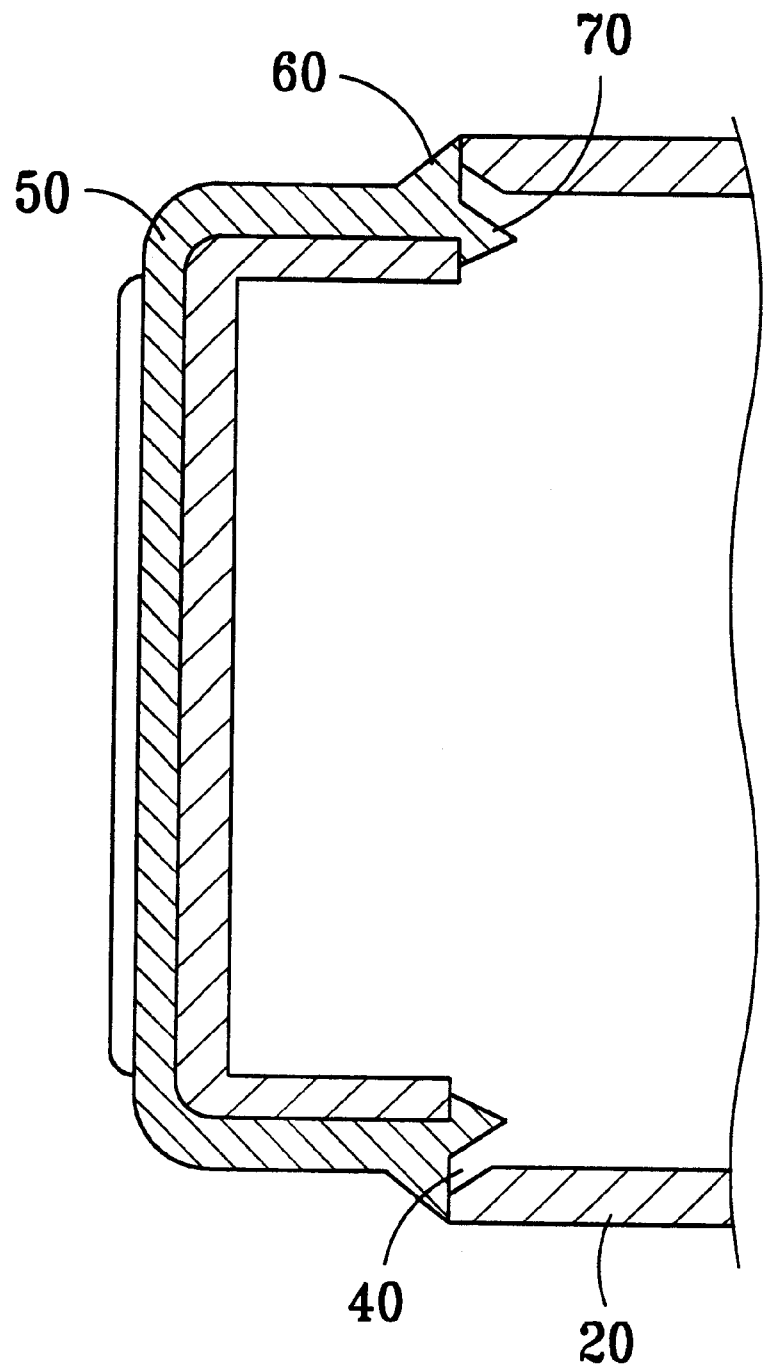
FIG. 3 is a partial section view illustrating the resistant pad structure for the tape measure housing of the present invention.

Referring to FIGS. 1 to 3, a tape measure housing with a slip resistant pad structure according to the present invention comprises a housing g20 for the tape measure 10 and a slip resistant pad 50. There is a recessed portion 30, provided on a peripheral side of the housing 20. At both sides of the resistant portion 30, a pair of elongated engaging through slots 40 is provided for fastening the slip resistant pad 50. A decorative pattern is formed on an outer surface of the slip resistant pad 50. Along both sides of the slip resistant pad 50, a pair of press fit stripes 60 are integrally protruded therefrom for auxiliary engagement in assembly. A lower inner side of each of the press fit stripes 60 forms an inversely stretched claw 70. To secure closely matching the appearance of the housing 20, the slip resistant pad 50 is constructed in arc shape or others if necessary.

Referring to FIG. 3, a sectional view of the slip resistant pad structure for the tape measure housing of the present invention is illustrated, wherein each of the inversely stretched claws 70 deeply stretches through the respective elongated engaging through slot 40 and firmly hooks on an inner wall of the elongated engaging through slot 40 so as to engage the two inversely stretched claws 70 with the two elongated engaging slots 40 respectively for completing the assembly of the slip resistant pad 50 with the tape measure housing 20.

Of course, the slip resistant pad 50 may be installed at any portion on the housing 20 according to the actual requirement.

In conclusion, the above described slip resistant pad structure of the present invention has many advantages compared to those conventional structures and that the above cited patented case may provided the following main features.

1. The appearance of the slip resistant pad according to the present invention is mush more easier to match the configuration of tape measure housing.
2. The slip resistant pad structure according to the present invention can comfortably fit the user's feeling of palm and never slip off the user's grip even when his(her) palm is severely sweating as the decoratively patterned stripes on the pad surface may provide necessary slip resistant friction between the user's palm and the pad surface.
3. The simple inversely stretched claws eliminate the use of bonding adhesives and ensure the engagement of the slip resistant pad to the housing in a more reliable manner.
4. The assembly and detachment of the above describe structure are simple, easy and time saving, that result in increasing the practicability and decreasing the manufacturing cost of the tape measure.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A tape measure housing; comprising:

a housing having a recessed portion provided on a peripheral side thereof, and a pair of elongated engaging through slots is provided along both sides of said recessed portion respectively; and a slip resistant pad having a size fitting said recessed portion, wherein along two sides of said slip resistant pad, two press fit stripes are integrally protruded therefrom, a lower inner side of each of said press fit stripes forming an inversely stretched claw to stretch through said respective elongated engaging through slot and firmly hook on an inner wall of said respective elongated engaging through slot, so as to engage said two inversely stretched claws with said two elongated engaging through slots respectively for attaching said slip resistant pad to said recessed portion of said housing.

2. The tape measure housing, as recited in claim 1, wherein a decorative pattern is formed on an outer surface of said slip resistant pad.

3. The tape measure housing, as recited in claim 1, wherein said slip resistant pad is constructed in arc shape.

4. The tape measure housing, as recited in claim 2, wherein said slip resistant pad is constructed in arc shape.

* * * * *